United States Patent [19]

Gans, Jr. et al.

[11] 4,081,323
[45] Mar. 28, 1978

[54] SUBATMOSPHERIC DOUBLE CONTAINMENT SYSTEM

[75] Inventors: Daniel Gans, Jr., Milton; John H. Noble, Wellesley, both of Mass.

[73] Assignee: Stone & Webster Engineering Corporation, Boston, Mass.

[21] Appl. No.: 556,170

[22] Filed: Mar. 6, 1975

[51] Int. Cl.² .............................................. G21C 9/00
[52] U.S. Cl. ...................................... 176/38; 176/37; 176/87
[58] Field of Search .............................. 176/37, 38, 87

[56] References Cited

U.S. PATENT DOCUMENTS

| | | | |
|---|---|---|---|
| 3,258,403 | 6/1966 | Malay | 176/37 |
| 3,307,913 | 3/1967 | Chave | 176/37 X |
| 3,322,141 | 5/1967 | Gans, Jr. et al. | 137/312 |
| 3,438,857 | 4/1969 | Sulzer | 176/37 |

FOREIGN PATENT DOCUMENTS

| | | | |
|---|---|---|---|
| 1,109,278 | 6/1961 | Germany | 176/56 |

OTHER PUBLICATIONS

Proceedings of the 3rd International Conference on the Peaceful Uses of Atomic Energy, vol. 13 Nuclear Safety, 1965 (pp. 362–419).

Power Reactor Containment, Schmitz et al. "Nucleonics" Oct. 1962, pp. 50–55.

Chave, C.T., "Problems Associated with Siting Nucl. Reactors in a Metro. Area" Apr. 12, 1966 (pp. 1, 13–14).

Chave, C.T., "Containment for Water Reactor Nucl. Power Plants—Part I–Dry Containment" Aug. 18–20, 1965 (pp. 25–26).

*Primary Examiner*—Samuel W. Engle
*Assistant Examiner*—Ralph Palo
*Attorney, Agent, or Firm*—Morgan, Finnegan, Pine, Foley & Lee

[57] ABSTRACT

A reinforced concrete double wall nuclear containment structure with each wall including an essentially impervious membrane or liner and porous concrete filling the annulus between the two walls. The interior of the structure is maintained at subatmospheric pressure, and the annulus between the two walls is maintained at a substmospheric pressure intermediate between that of the interior and the surrounding atmospheric pressure, during normal operation. In the event of an accident within the containment structure the interior pressure may exceed atmospheric pressure, but leakage from the interior to the annulus between the double walls will not result in the pressure of the annulus exceeding atmospheric pressure so that there is no net outleakage from the containment structure.

14 Claims, 2 Drawing Figures

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations, process steps, and improvements herein shown and described.

SUMMARY OF THE INVENTION

Briefly described, the containment structure of the present invention as herein preferably embodied comprises a conventional reinforced concrete outer pressure retaining shell and two spaced apart inner gastight membranes or boundaries which define an annular space therebetween. Each boundary consists of a steel liner; necessary openings in the liners are sealed in a conventional manner by valves or blank flanges. The boundaries preferably are separated with porous or "popcorn" concrete with the voids filled with air. The horizontal or floor portions between the boundaries advantageously may be separated by concrete block or some other appropriate equivalent means capable of providing the desired interconnected air passages. The interior of the containment structure is connected to an evacuation system and the annular space between the inner and outer boundaries is also preferably connected to a separate evacuation system, although this latter system is not necessary for the invention to operate with satisfactory results.

During normal operation, the interior of the containment structure is evacuated and the pressure therein reduced to and maintained at a subatmospheric pressure, preferably about 9.5 psia (pounds per square inch absolute). The annular space between the inner and outer boundary is also preferably evacuated and is maintained at a pressure intermediate to the atmospheric pressure outside of the containment structure and the subatmospheric pressure of the containment interior, but in no event greater than 2 inches of water pressure below the lowest recorded surrounding atmospheric pressure.

Open arteries, or passages, within the annular space assure that all void spaces within the annular space throughout the containment are interconnected. However, since all boundaries leak to some extent, the pressure in the annular space during normal operation of the containment system will be intermediate to the interior and exterior ambient pressures. Thus, an illustrative operating pressure for the annular space 5 is 12 psia, where the interior containment pressure is 9.5 psia and the ambient atmospheric pressure is 14.7 psia.

The containment structure of the present invention preferably also includes suitable barometric pressure detection equipment, to verify that the pressure in the annular air space is always at an intermediate level; a suitable leakage location system for the outer containment liner, so that it can be repaired if ever necessary; and a block valve seal water system for pipes which are not normally full of water and which pass through the containment wall.

It will be understood that the foregoing general description and the following detailed description as well are exemplary and explanatory of the invention but are not restrictive thereof.

The accompanying drawings, referred to herein and constituting a part hereof, illustrate a representative pressure transient curve for subatmospheric containment and also a preferred embodiment of the containment structure of the invention, and together with the description, serve to explain the principles of the invention.

DESCRIPTION OF THE PREFERRED EMBODIMENT

Figure 1:
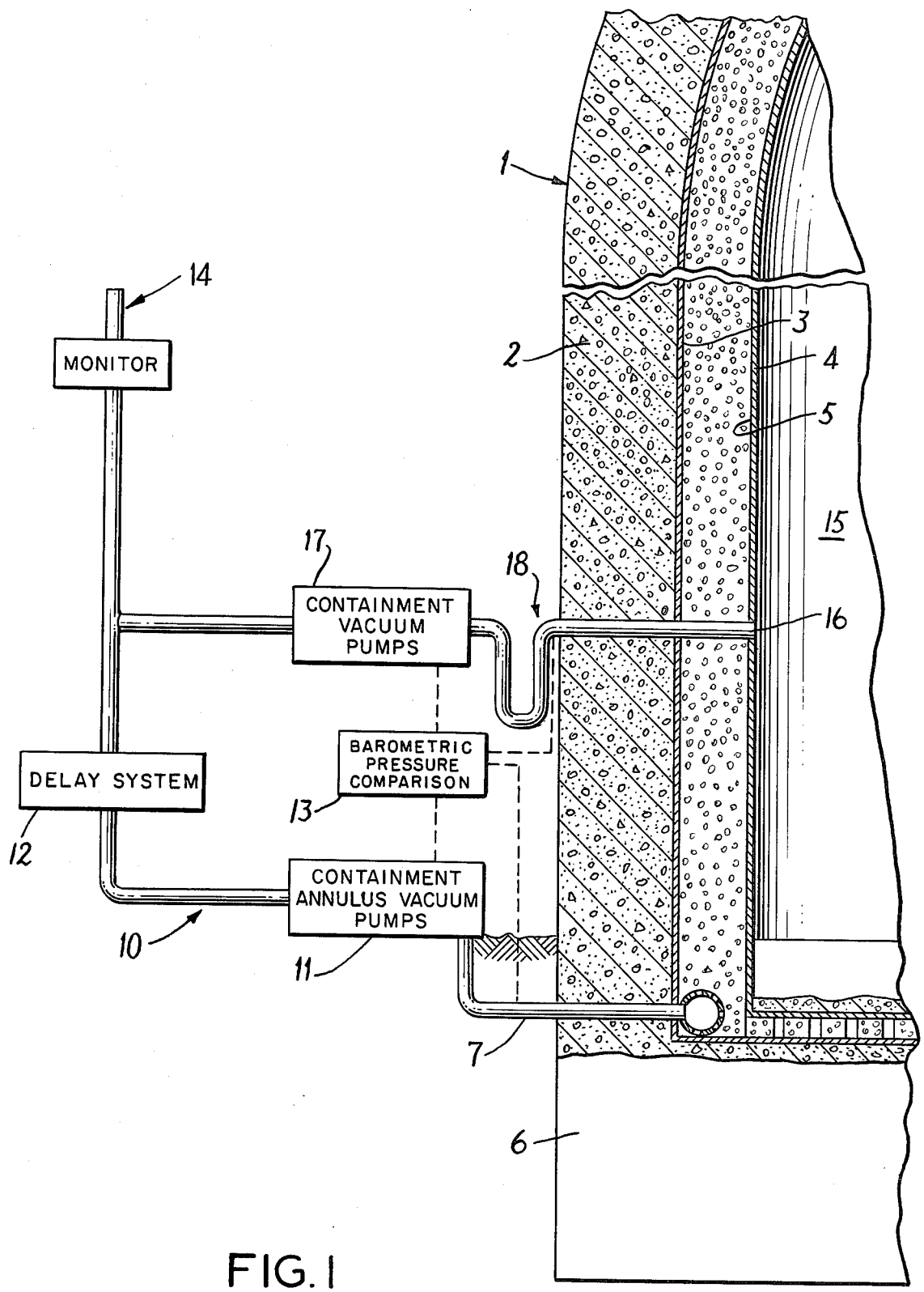
FIG. 1 is a fragmentary view in elevation, partly sectional and partly schematic, of a containment structure constructed in accordance with the present invention.

Referring now more particularly to FIG. 1 of the accompanying drawings, there is illustrated a double wall containment structure constructed in accordance with the invention so as to provide a reliable, fail-safe containment system, particularly adapted for use with nuclear reactors.

To this end, there is provided a containment structure indicated generally by reference numeral 1, consisting essentially of an outside reinforced concrete pressure shell 2, two impervious membranes or liners 3 and 4 which define an annular space 5 therebetween filled with porous or "popcorn" concrete, and a suitable foundation mat 6. Both liners 3 and 4 preferably are conventionally constructed of steel.

Containment structure 1 is also provided with a plurality, preferably two or three, conduits of 7, commonly known as containment piping penetrations, which extend from the annular space 5 to the exterior of the structure 1.

In accordance with the invention, an annulus air evacuation system, indicated generally by reference numeral 10, is connected directly to the piping penetrations 7 and functions to assure maintaining the annular space 5 at a pressure below that of the ambient atmosphere since this space is normally to be at subatmospheric pressure during plant operation. As preferably embodied, the annulus air evacuation system 10 comprises a plurality, preferably two or three, of suitable vacuum pumps, indicated schematically at 11, a delay system, indicated schematically at 12, a barometric pressure comparison system, indicated schematically at 13, and a monitored vent, indicated schematically and generally by reference numeral 14.

The containment annulus vacuum pumps 11 operate, if required, to evacuate air from the annular space 5 and maintain it at a pressure at least 2-3 inches of water pressure below the lowest recorded barometric ambient air pressure, and preferably at least 4-5 inches of water pressure below the aforesaid ambient pressure. The barometric pressure comparison system 13 is electrically linked to the annulus vacuum pumps 11 and operates to automatically start or stop the annulus vacuum pumps as determined by the difference between the lowest recorded barometric ambient air pressure and the actual pressure in annulus 5.

The delay system 12 is a conventional back-up system, which serves as an extra safeguard to minimize any radioactivity released to the atmosphere, that should never be needed. Advantageously, it contains high efficiency filter material and an adsorbent material, such as

SUBATMOSPHERIC DOUBLE CONTAINMENT SYSTEM

BACKGROUND AND OBJECTS OF THE INVENTION

1. Field of the Invention

This invention relates in its most general aspects to a containment structure for enclosing any dangerous material for any device which may create a dangerous environment upon failure. The invention is particularly directed to the containment of nuclear power plant reactors wherein a failure of the reactor coolant system could result in the release of dangerous radioactive gases, liquids, or vapors as postulated for certain hypothetical accidents including that referred to as the "maximum credible accident", which postulates the complete and very rapid release of the contents of the reactor coolant system into the interior of the containment structure.

2. Description of the Prior Art

Containment structures for nuclear reactors have been developed to the point where they are a standard component of all nuclear power plants. Some leakage from containment structures built in accordance with the prior art can be tolerated for nuclear power plants sited in low population density areas. However, in the case wherein the nuclear reactor is located in close proximity to more heavily inhabited areas, a reliable, fail-safe containment structure is essential. In densely populated areas it is vital that the containment structure be capable of preventing the leakage of all radioactive gases, liquids, or vapors to the atmosphere for even the shortest period of time.

The trend in the nuclear power industry is toward locating nuclear reactors in close proximity to more heavily inhabited areas. Economic and environmental reasons dictate that a minimum length of transmission lines be used to convey the electrical power generated by the nuclear reactor to the ultimate user. In addition, as populated areas expand and encroach on otherwise suitable power station sites, containment designs must be improved to compensate for shorter exclusion distances.

Considerable work has been done in developing containment structures for nuclear reactors. Among the various structures developed for containment of nuclear reactors are double walled containment structures such as disclosed in U.S. Pat. No. 3,322,141 (Gans et al., May 30, 1967), U.S. Pat. No. 3,320,969 (Gordon, May 23, 1967) and U.S. Pat. No. 3,258,403 (Malay, June 28, 1966). However, in each of these structures the containment pressure is always positive with respect to the atmosphere. Even with these double walled nuclear reactor containment structures, the out-leakage of vapors and gases from the inner boundary will continue indefinitely after a nuclear reactor coolant system failure until the containment can be safely vented to atmospheric pressure.

The concept of the previously known double walled containment structures is also disadvantageous in that it required all outleakage from the inner containment boundary and all inleakage from the outer containment boundary to be pumped back into the interior containment, thereby slowly building up pressure in the interior containment until such time as the interior containment could be safely vented to the atmosphere. This is not a practical or desirable solution in the long term from a safety standpoint since the contained energy of the containment structure becomes increasingly higher and no subsequent, long-term failures in the containment barrier system can be tolerated. In addition, in the double wall containment structure designs previously developed, access to the containment interior for decontamination and subsequent maintenance is impossible until such time as the pressure in the containment interior can be reduced to near atmospheric pressure. This access requirement becomes especially important for it prevents the repair of small breaks which result in less than maximum credible accident conditions and radiation exposures that can be tolerated for practicable periods of time.

Figure 2:
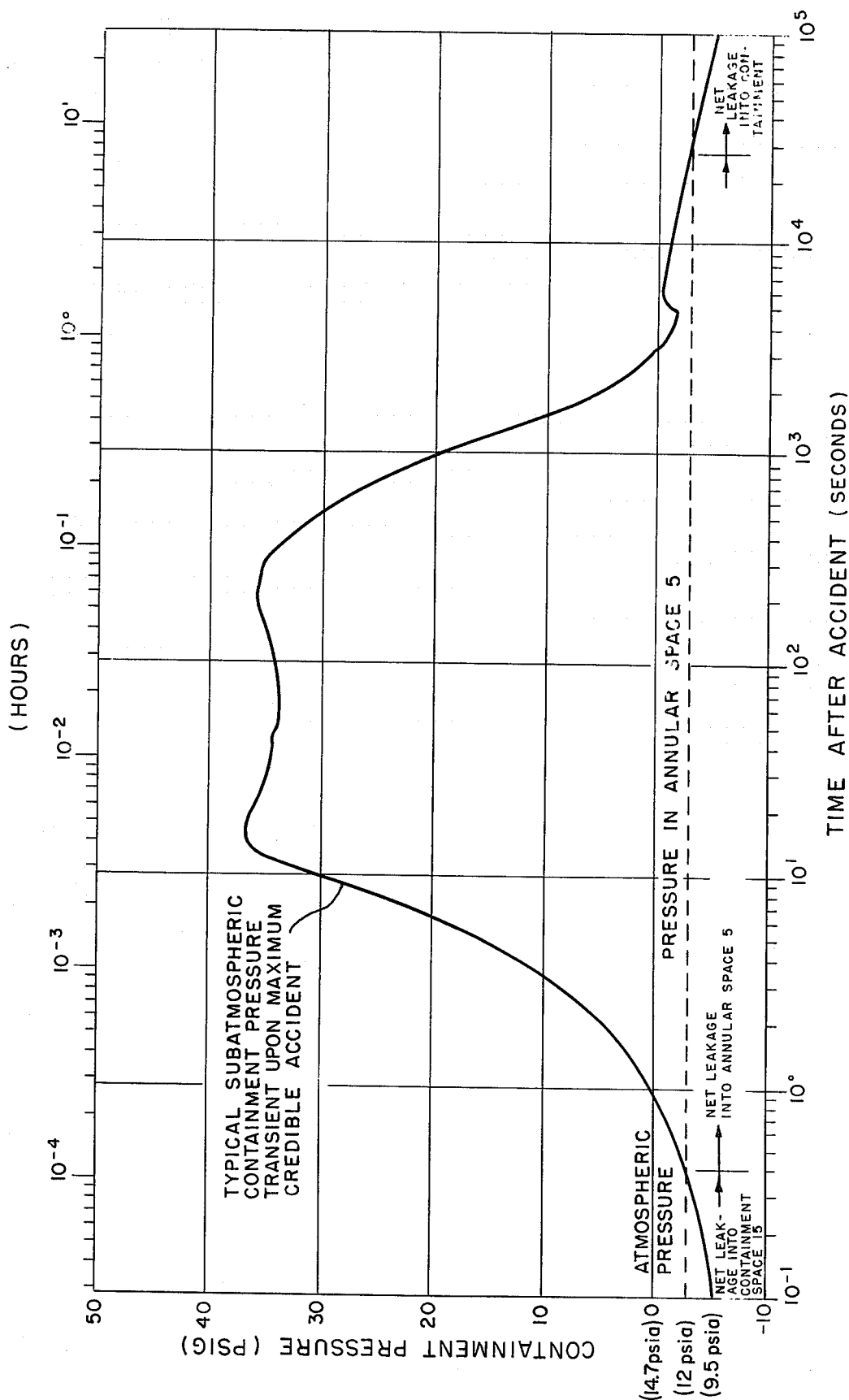
FIG. 2 is a graph plotting containment interior and annular space pressures against time following a maximum credible accident for a containment system constructed in accordance with the present invention.

Vacuum or subatmospheric containment structures having a single essentially impervious membrane or liner have also been previously developed. However, even with vacuum or subatmospheric systems, the containment pressure is positive with respect to the atmospheric pressure for a period of time, on the order of one hour following a maximum credible accident. A typical subatmospheric containment pressure transient for a maximum credible accident is shown in FIG. 2. Thus, a pressure which is initially about 5 psi below atmosphere rises in about 20 seconds to about 37 psi above atmospheric pressure, or about 52 psia. At this time the containment pressure reduction safety features become operative and the containment pressure is reduced to less than atmospheric pressure in about an hour.

During this approximate one hour time period, liquid and gaseous radioactivity can leak through the single containment boundary. Dependent on circumstances such as the exclusion distance (distance of the structure from the site boundary), and the meteorological conditions, the outleakage during this time of positive pressure operation may require pre-treatment with additional engineered safety systems, such as alkaline containment spray or containment air recirculation systems with particulate and activated charcoal filters, which only partially remove radioactive materials.

Although it has also been previously suggested that vacuum or subatmospheric containment structures may be designed such that the interior of the containment does not reach atmospheric pressure in the event of an accident, and also that double containment may be utilized in conjunction with vacuum or substmospheric operation of a containment structure, no structure for implementing these suggestions has been presented and, furthermore, these suggestions do not encompass the reliable, failsafe containment system of the present invention.

OBJECTS OF THE INVENTION

It is therefore the principal object of this invention to provide a new and improved containment system.

Another object of this invention is to provide a new and improved containment system having particular application for nuclear power plant reactors, which is reliable and fail-safe.

Another object of this invention is to provide a new and improved reliable and fail-safe containment structure which is double walled and operates with the interior containment at a subatmospheric pressure and the annular space between the two walls also at a subatmospheric pressure but at a pressure intermediate between that of the interior and the surrounding atmosphere, resulting in no outleakage from the containment even in the event of a maximum credible accident.

silica gel or activated charcoal, to remove most radioactive particulate and gaseous contaminants from the air, should air be evacuated from the annular space 5. For complete removal of all noble fission product gases, principally kryptons, a conventional gas dryer and cryogenic sorption separation unit also may be advantageously added to and included in system 12 to liquefy and store these gases. The purified evacuated air is thereafter monitored and vented safely to atmosphere by vent 14. Any radioactive materials separated from the evacuated air can be stored on-site or shipped off-site for final disposal.

The interior 15 of the containment structure 1 is connected to other piping penetration lines 16 that pass through the entire containment wall 4, 5, 3, 2, to a plurality, preferably two or three, of suitable containment vacuum pumps 17.

The containment vacuum pumps 17 function to reduce the pressure inside containment space 15 below the pressure within the annular space 5 during normal operation, and are controlled in this regard by a second function of the barometric pressure comparison system 13 previously discussed. For example, the pressure in containment space 15 preferably is maintained at approximately 9.5 psia. This assumes that the normal air pressure outside of the containment structure is "atmospheric", i.e., 14.7 psia.

It is, of course, important to the satisfactory operation of the subject invention that the pressure of the containment space 15 and the annular space 5 be maintained so that during no conceivable accident pressure transient will the air pressure within annular space 5 exceed a value amounting to the lowest recorded pressure of the ambient atmosphere. Advantageously, as an additional safety factor, the air pressure in annular space 5 should not exceed a value amounting to 2 to 3 inches of water pressure below the aforesaid ambient atmosphere upon a maximum credible accident. As here embodied, these results are achieved by maintaining the pressure of annular space 5 at at least 2-3 inches of water pressure, and preferably at least 4-5 inches of water pressure, below the aforesaid ambient atmosphere, while maintaining the pressure of the inner containment space at approximately 9.5 psia, where the ambient atmospheric pressure is approximately 14.7 psia.

Advantageously, a conventional piping block valve seal water system, indicated generally by reference numeral 18, is also provided for all piping penetrating the containment structure 1, other than lines 7, which are not normally full of water, as shown in a typical suction line 16 leading to the containment vacuum pumps 17. This sealing system prevents radioactive gases and vapors from bypassing containment.

Other piping and electrical penetrations (not shown) are advantageously protected against leakage by designs similar to those appearing in FIGS. 8 and 9 of U.S. Pat. No. 3,322,141, previously discussed.

Also, a suitable containment liner leakage location system (not shown) is also advantageously provided for the structure, so as to locate leaks that may develop with time in the impervious membranes or steel liners 3, 4. A preferred system of this type is described and illustrated in U.S. Pat. No. 3,444,725.

Practice has taught that with a containment structure embodied by the present invention, after a loss-of-coolant accident and while the pressure in the interior 15 of the containment structure is greater than the pressure of the annular space 5 between the containment liners 3, 4, all of the gases leaking out through the inner liner 4 will be collected within the annular space and the pressure of the annular space will rise slightly but remain significantly less than atmospheric pressure, thereby preventing outleakage to the environment.

Typically, the design leakage rate of gases through the inner containment liner 4 of a containment structure having an internal free volume of about 1,800,000 cu.ft. will be less than 1¼ cubic feet per minute (1/10 percent per 24 hours) at design temperature and pressure; the volume of voids within the porous concrete in the annular space 5 will be approximately 54,000 cubic feet; and the containment space 15 depressurization time will be 50 minutes. During the containment pressure transient the pressure in the annular space 5 will increase less than 0.05 pounds per square inch or, less than approximately 1½ inches of water pressure due to the inleakage of gases through liner 4. Thus, annular space 5 provides a static safeguard reservoir for gases, without the requirement for operating equipment or interconnecting piping. Also, pump-back equipment is not required as in previously known double wall containment structures, and the containment annulus vacuum pumps 11 and delay system 12 constitute only back-up equipment during accident conditions within the containment structure of the present invention.

The pressure relationship, as a function of time, between inner containment space 15, annular space 5, and atmospheric pressure following a maximum credible accident for a typical design embodying the containment structure of the present invention is also shown in FIG. 2.

Thus, FIG. 2 is a graph plotting the containment interior pressure and the annular space pressure against time following a maximum credible accident in a light water reactor enclosed within a nuclear containment system constructed in accordance with the invention.

The top curve illustrates a typical pressure transient for the containment interior, where the pressure, which is initially about 5 psi below atmosphere, rises in about 20 seconds to about 37 psi above atmospheric pressure, or about 52 psia. At this time, the containment pressure reduction safety features become operative and the containment pressure is reduced to less than atmospheric pressure in about an hour.

The lower curve, which appears to be a straight line, illustrates the pressure transient occurring in the annular space 5 between the two containment liners 3, 4, where the initial pressure is, illustratively, 12 psia. Four seconds after the start of the maximum credible accident, air from the inside containment space 15 begins to leak into the annular space 5 until the containment pressure transient peaks and is subsequently reduced below 12 psia less than 8 hours later. During this period, the annular space pressure increases less than 0.05 psi, making the transient curve appear as a straight line. At no time does the annular space pressure exceed atmospheric pressure (14.7 psia), so there is never leakage from the annular space to the outside of the containment structure 1 and the environment.

As the inner containment pressure once again becomes subatmospheric after, say, 50 minutes, due to cooling the gases and vapors in the containment space 15 with conventional containment engineered safety features (not shown), the gas pressures in containment space 15 and annular space 5 come to new conditions relative to each other but, by predetermined selection of containment free air volume, never exceed atmospheric pressure. Should there be a subsequent failure of a redundant containment engineered safety cooling system component located outside of the containment 1, the reservoir capacity of annular space 5 provides additional time to make repairs, while preventing the release of radioactive gases and vapors to the environment. Thus, the containment system as here embodied provides an essentially static, fail-safe system and, hence, improved nuclear safety superior to previously known containment systems.

After a loss-of-coolant accident and the subsequent depressurization of the containment space 15 with conventional containment engineered safety features (not shown), outside air inleakage through liners 3 and 4 results in a long-term rise in the pressure of containment space 15, but only after the reservoir capacity of annular space 5 has been filled. However, as the differential pressure across annular space 5 approaches zero, air inleakage decreases to exceedingly small values and the volume of air to be handled by the containment annulus vacuum pumps 11, if any, diminishes accordingly. Furthermore, due to the long hold-up time, the concentration of radioactive gases and vapors contained in annular space 5 is significantly reduced through decay. This long-term isolation of the contents of the containment structure prior to any necessity for removal is also advantageous in that it permits many more economical engineering solutions to the design and efficiency of the back-up delay system 12, and to ultimate safe venting of gases and vapors from the containment structure to the atmosphere.

It will be understood that the double wall subatmospheric containment system as here embodied may also advantageously be combined with other containment systems, e.g. an ice containment system as described in U.S. Pat. No. 3,423,286, or a system employing pressure suppression pools, such as described in U.S. Pat. No. 3,494,828. When combined with such systems as these latter systems, a containment structure may be designed so that the pressure transient in containment space 15 upon a maximum credible accident does not exceed atmospheric pressure.

The invention in its broader aspects is not limited to the specific embodiments herein shown and described but departures may be made therefrom within the scope of the accompanying claims, without departing from the principles of the invention and without sacrificing its chief advantages.

What is claimed is:

1. A containment structure for a nuclear reactor or the like, including:
    an outer pressure-containing shell member;
    an inner pressure-containing shell member within and inwardly spaced from said outer shell member so as to create an annular space between said inner and outer containment shells;
    means fixedly mounting said inner and outer shell members to a base member forming a foundation for said containment structure;
    first conduit means extending from outside said containment structure through said inner and outer shell members connecting the interior of said inner shell member to a first evacuation system,
    said first evacuation system operating during normal operation to maintain the interior of said inner shell member normally at a subatmospheric pressure;
    second conduit means extending from outside said containment structure through said outer shell member connecting said annular space to a second evacuation system,
    said second evacuation system operating during normal operation to maintain said annular space normally at a subatmospheric pressure which is intermediate that of the interior of said inner shell member and the ambient atmospheric pressure;
    said inner and outer shell members containing sufficient free air volume in the interior and annular containment spaces, respectively, so that during a loss-of-coolant accident, including the maximum credible loss-of-coolant accident, resulting in the release of radioactive gases, liquids and vapors within the containment structure, the pressure of said annular space does not exceed the ambient atmospheric pressure without further operation of said first and second evacuation systems and, consequently, no outleakage of radioactive gases and vapors from the containment structure occurs and such gases and vapors remain in the containment structure after said loss-of-coolant accident without further operation of said first and second evacuation systems until such time as they may be safely vented to the atmosphere.

2. A containment structure as claimed in claim 1, including vent conduit means connected to each of said first and second conduit means for venting gases and vapors evacuated from said containment structure during normal operation,
    said vent conduit means connected to said second conduit means also serving to vent radioactive gases and vapors released into the containment structure during said loss-of-coolant accident after a sufficiently long-term confinement therein so as to significantly reduce their radioactivity through decay,
    said vent conduit means including means for monitoring the radioactivity of gases and vapors vented from each of said first and second conduit means.

3. A containment structure as claimed in claim 1, wherein each of said first and second evacuation systems include vacuum pump means, barometric pressure comparison means, and electrical circuit means connecting said vacuum pump means to said barometric pressure comparison means automatically maintaining the interior and annular containment spaces at the desired respective subatmospheric pressures during said normal operation of said first and second evacuation systems.

4. A containment structure as claimed in claim 1, wherein the interior containment space is maintained at approximately 9.5 psia during normal operation and said annular containment space is maintained at at least 2 inches of water pressure below said ambient atmospheric pressure during normal operation.

5. A containment structure as claimed in claim 1, including
    additional piping penetration conduits extending into the containment structure which are not normally filled with water, and wherein
    each of said first conduit means and said additional piping penetration conduits include block valve water seal means.

6. A containment structure as claimed in claim 1, wherein:
said outer shell member comprises a reinforced concrete lined on the inner surface thereof with a steel liner;
said inner shell member comprises a steel shell; and
said annular space between said inner and outer shell members is filled with porous concrete.

7. A containment structure as claimed in claim 1, wherein said inner and outer shell members contain sufficient free air volume in said interior and annular containment spaces, respectively, and said respective subatmospheric pressures of said interior and annular containment spaces during normal operation are of a value so that during said maximum credible loss-of-coolant accident the pressure in said annular space does not exceed a level which is at least 2 inches of water pressure below said ambient atmospheric pressure.

8. A containment structure as claimed in claim 2, wherein said second evacuation system includes means for minimizing any radioactivity of the gases and vapors withdrawn from the containment structure prior to venting to the atmosphere.

9. A containment structure as claimed in claim 7, wherein said annular containment space is maintained at at least four inches of water pressure below said ambient atmospheric pressuring during normal operation.

10. In a containment structure for a nuclear reactor or the like having an outer pressure-containing shell and an inner pressure-containing shell within and inwardly spaced from the outer shell so as to create an annular space between the inner and outer shells, a method for preventing outleakage of radioactive gases and vapors released into the containment structure during a loss-of-coolant accident, including the maximum credible loss-of-coolant accident, comprising the steps of:
evacuating and maintaining the interior containment space defined by the inner shell at a subatmospheric pressure during normal operation;
evacuating and maintaining said annular space at a subatmospheric pressure intermediate that of said interior containment space and the ambient atmospheric pressure during normal operation;
constructing said inner and outer shell of a size to contain sufficient free air volume in said interior and annular containment spaces so that during said loss-of-coolant accident the pressure increase in said annular space caused by said release of radioactive gases and vapors into the containment structure does not exceed said ambient atmospheric pressure;
discontinuing evacuation of said interior and annular containment spaces during said loss-of-coolant accident, whereby outleakage of said radioactive gases and vapors from said containment structure is not possible; and
confining said radioactive gases and vapors in said containment structure after said loss-of-coolant accident without further evacuation therefrom until such time as they are capable of being safely vented to the atmosphere.

11. A method as claimed in claim 10, wherein said subatmospheric pressures during normal operation and said contained free air volumes of said interior and annular containment spaces are selected so that during said maximum credible loss-of-coolant accident the pressure in said annular space does not exceed a level which is at least 2 inches of water pressure below said ambient atmospheric pressure.

12. A method as claimed in claim 10, wherein said interior containment space is evacuated and maintained at approximately 9.5 psia during normal operation, and said annular containment space is evacuated and maintained at at least two inches of water pressure below said ambient atmospheric pressure during normal operation.

13. A method as claimed in claim 11, wherein said interior containment space is evacuated and maintained at approximately 9.5 psia during normal operation, and said annular containment space is evacuated and maintained at at least four inches of water pressure below said ambient atmospheric pressure during normal operation.

14. A method as claimed in claim 10, including the steps of:
confining said radioactive gases and vapors in said containment structure for a sufficient period of time so as to significantly reduce their radioactivity through decay,
evacuating said radioactive gases and vapors from said annular containment space to the atmosphere after said confinement,
minimizing any radioactivity of the evacuated gases and vapors by removing at least a portion of the radioactive particulate and gaseous contaminants therefrom, and
monitoring the radioactivity of said evacuated radioactive gases and vapors.

* * * * *